United States Patent [19]

Fukuma et al.

[11] 4,377,678

[45] Mar. 22, 1983

[54] BINDERS FOR POLYDIENE COMPOSITE PROPELLANTS

[75] Inventors: Daizo Fukuma, Sakado; Shigeru Suzuki; Kensho Shirota, both of Sayama; Kunihiro Harada, Machida, all of Japan

[73] Assignees: Nissan Motor Company, Ltd., Kanagawa; Japan Synthetic Rubber Co., Ltd., Tokyo, both of Japan

[21] Appl. No.: 198,957

[22] PCT Filed: Oct. 5, 1979

[86] PCT No.: PCT/JP79/00252

§ 371 Date: Jun. 4, 1980

§ 102(e) Date: Jun. 4, 1980

[87] PCT Pub. No.: WO80/00698

PCT Pub. Date: Apr. 17, 1980

[30] Foreign Application Priority Data

Oct. 6, 1978 [JP] Japan .............................. 53/123345

[51] Int. Cl.³ ...................... C08G 18/62; C08G 18/48
[52] U.S. Cl. ..................................... 528/75; 149/19.4; 523/180
[58] Field of Search ........................................... 528/75

[56] References Cited

U.S. PATENT DOCUMENTS

| | | | |
|---|---|---|---|
| 3,440,292 | 4/1969 | Allen | 260/633 |
| 3,674,743 | 7/1972 | Verdol et al. | 260/73 L |
| 3,745,074 | 7/1973 | Allen | 149/7 |
| 3,748,199 | 7/1973 | Vriesen et al. | 149/19 |
| 3,758,426 | 9/1973 | Boivin et al. | 260/18 TN |
| 3,792,003 | 2/1974 | Duchesne | 260/18 TN |
| 3,801,385 | 4/1974 | Mastrolia et al. | 149/19 |
| 3,883,375 | 5/1975 | Mastrolia et al. | 149/19.9 |
| 4,019,933 | 4/1977 | Cuksee et al. | 149/19.4 |
| 4,083,834 | 4/1978 | Komatsu et al. | 526/55 |
| 4,234,714 | 11/1980 | Earing et al. | 528/67 |

FOREIGN PATENT DOCUMENTS 48-23912 3/1973 Japan.

OTHER PUBLICATIONS

Law, Jour. Polymer Sci., Part A-1, vol. 9, pp. 589-615, (1971).

Primary Examiner—H. S. Cockeram
Attorney, Agent, or Firm—Schwartz, Jeffery, Schwaab, Mack, Blumenthal & Koch

[57] ABSTRACT

The present invention is a binder for a polydiene composite propellant comprising a small amount of binder and has as its object the production of the binder, which can provide stable physical properties between production lots and has a long pot life, and consists mainly of a polymer which has a predetermined molecular weight between crosslinks and which is obtained by reacting a combination of a polydiene glycol having a hydroxyl group number of 1.8-2.1 and a number average molecular weight of 1,000-5,000, a trifunctional crosslinking agent, a diisocyanate and a bifunctional chain extender. When a diene polymer having a functional group number of not more than 1 is additionally added to the above described combination, the elongation of the binder is improved and the use of a plasticizer can be reduced or eliminated.

5 Claims, 1 Drawing Figure

—o—o— ; Polymer used in the Present Invention x ; R-45 Polymer

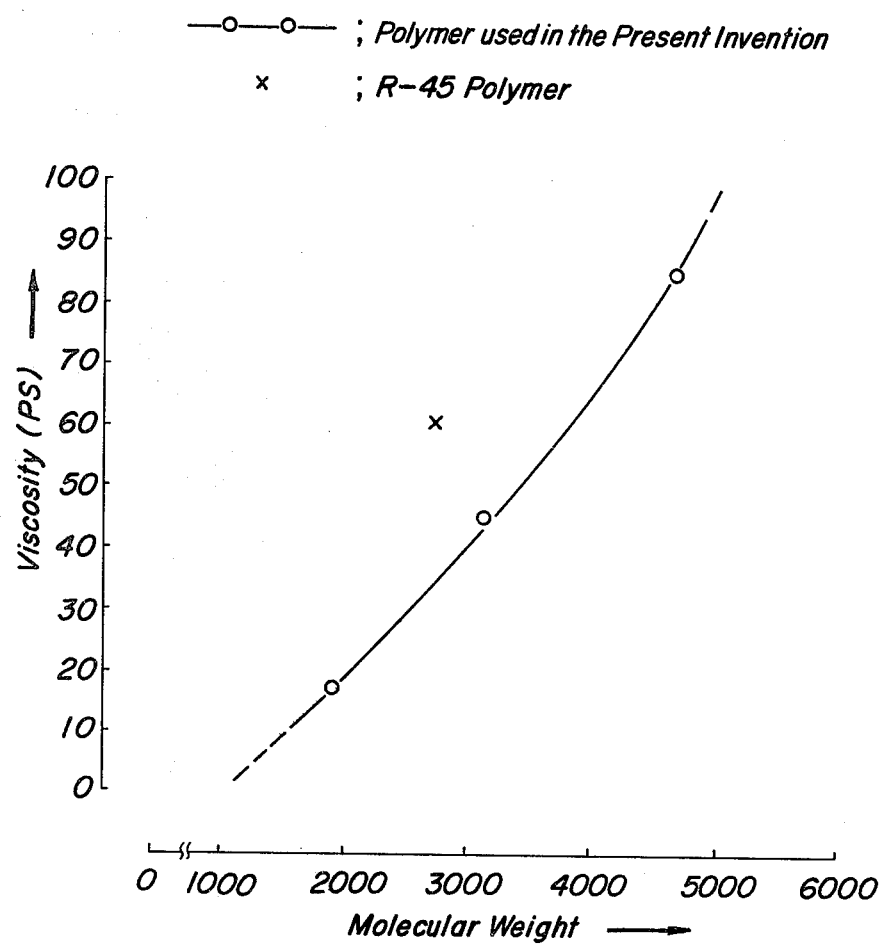

BINDERS FOR POLYDIENE COMPOSITE PROPELLANTS

TECHNICAL FIELD

The present invention relates to binders for polydiene, particularly polybutadiene composite propellants.

BACKGROUND ART

Binders in which the crosslinks are formed by subjecting a hydroxyl terminated polybutadiene and diisocyanate to urethane reaction have been disclosed as the binder for polybutadiene composite propellant, particularly propellant using a small amount of binder. Hydroxyl terminated polybutadiene used for such binder is represented by R-45 made by ARCO Chemical Co. Ltd. in U.S.A. and is a polymer having a functional group number of 2.2–2.5 and a number average molecular weight of 2,000–3,000, which is produced by radical reaction. In view of this functional group number value, it is apparent the structure of the nominally bifunctional polymer contains a relatively large amount of polymer having three or more functional groups, so that the content of the polymer having three or more functional groups in the above described hydroxyl terminated polybutadiene varies and therefore even if the amount of diisocyanate added is adjusted depending upon this variation when producing the binder, the physical properties of the produced binder are uneven and the reliability when using for production of propellant as the binder is adversely affected thereby. Furthermore, the formation of the crosslink upon curing of the binder is relatively rapid due to the above described cause and the reaction rate with diisocyanate is rapid because the above described functional groups are primary, so that the pot life in propellant formation is short. When a plasticizer is used in order to obviate this problem, the specific impulse of the propellant is deteriorated.

DISCLOSURE OF INVENTION

An object of the present invention is to obviate the above described defect and to improve the physical properties (elongation, tensile strength, Young's modulus) of the binder for propellant using a small amount of binder.

The essential feature of the first aspect of the present invention consists in that a polydiene glycol having a hydroxyl group number of 1.8–2.1 and a number average molecular weight of 1,000–5,000 is used as the polydiene glycol and the molecular weights and the mole amounts of a trifunctional crosslinking agent, a diisocyanate of curing agent and a bifunctional chain extender are selected depending upon the above described hydroxyl group number and molecular weight respectively to set the average molecular weight between the crosslinks obtained in the above described reaction to the value which provides good physical properties. The composition of the binder in each production lot is determined in order to obtain the above described set molecular weight, whereby the reliably good physical properties of the binder can be surely obtained. Further, the pot life of the composite propellant slurry using the binder is prolonged by using a polydiene glycol wherein the hydroxyl groups are converted into the secondary or tertiary hydroxyl groups. The essential feature of the second aspect of the present invention consists in that the number average molecular weight of the polydiene glycol is limited to 1,000–3,500 in the above described composition and a diene polymer having a functional group number of less than 1, preferably 0 is added to the above described composition whereby the amount of a plasticizer added is reduced or the addition is not necessary and the above described high reliability and the moldability are maintained.

The preferable average molecular weight between the crosslinks is 7,000–15,000, particularly 8,000–10,000.

Polydiene glycols to be used in the present invention include polybutadiene glycol, polyisoprene glycol and the like. Particularly polybutadiene glycol (referred to as "HTPB" hereinafter) is preferable and in the present application, the invention will be explained with respect to HTPB hereinafter.

A typical process for producing HTPB in the present invention comprises polymerizing butadiene in an organic solvent by using a dilithium compound as a catalyst, treating the formed polymer with ethylene oxide (primary hydroxyl group), propylene oxide or an aldehyde (secondary hydroxyl group) or a ketone (tertiary hydroxyl group) to hydroxylate both terminal groups. It is necessary that HTPB polymer be a HTPB having a hydroxyl group number of 1.8–2.1 preferably 1.9–2.0 and a number average molecular weight of 1,000–5,000. One preferred embodiment of molecular structure of HTPB is shown in the following formula:

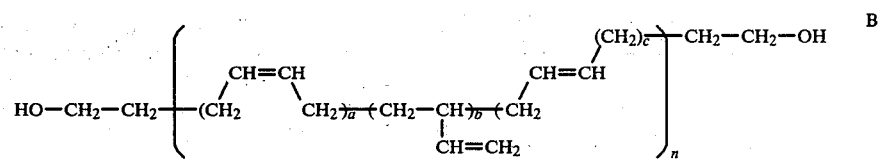

In the above formula, a, b and c show amounts of cis 1,4-bond, 1,2-vinyl bond and trans 1,4-bond respectively. In the above formula, hydroxyl groups are linked in the primary form but HTPB as shown in this formula is synthesized through living polymerization process, so that the hydroxyl bonding form may be apparently secondary or tertiary.

As the trifunctional crosslinking agent, use may be made of triols, such as polyoxyl propylated glycerin, polyoxyalkylene triol, trimethylol propane and the like, amino-alcohols, such as 2-ethyl-2-aminopropane diol and the like, and triamines, such as hydroxypropylated diethylene triamine and the like, these crosslinking agents having a molecular weight of 250–3,500.

As dissocyanates used as a curing agent, mention may be made of tolylene diisocyanate (abbreviated as TDI hereinafter), hexamethylene diisocyanate (abbreviated as HDI hereinafter), dimeryldiisocyanate (abbreviated as DDI hereinafter), isophorone diisocyanate (abbreviated as IPDI hereinafter) and the like.

As a bifunctional chain extender, mention may be made of aromatic diamines, such as 4,4'-methylene bis(2-chloroaniline), methylenedianiline, m-phenylenediamine, diphenylether-4,4'-diamine, naphthalene-1,5-diamine, m-tolylenediamine, p-chloro-o-phenylenediamine, derivatives and mixtures thereof and the like, aliphatic polyamines, such as ethylenediamine, trimethylenediamine, hexamethylene-1,6-diamine, propylenediamine and the like, and mixtures thereof, and as the diol chain extender, use may be made of propane-1,3-diol, allyloxypropanediol, butane-1,4-diol, butane-2,4-diol and the like and further polydiene glycols having a molecular weight of 500–1,000 may be used.

The compounding ratio of the above described crosslinking agent, chain extender and curing agent based on 10 moles of polydiene glycol (HTPB, polyisoprene glycol and the like) is preferred to be as follows:

| | | Binder composition | | | |
|---|---|---|---|---|---|
| HTPB (mole) | Triol (mole) | 2-ethyl-2-aminopropane diol or triamine (mole) | Diamine (mole) | Diol (mole) | Diisocyanate (mole) |
| 10 | 1.5–4.5 | 0 | 0–3.0 | 0 | Note-1 |
| 10 | 1.5–4.5 | 0 | 0 | 0–3.0 | Note-1 |
| 10 | 0 | 1.0–3.0 | 0–3.0 | 0 | Note-1 |
| 10 | 0 | 1.0–3.0 | 0 | 0–3.0 | Note-1 |

Note-1:
Compounding ratio of diisocyanate (moles):
$$\frac{20 + 3 \times (\text{moles of crosslinking agent}) + 2 \times (\text{moles of chain extender})}{2}$$

Remark:
HTPB was produced by polymerizing butadiene by using dilithiobutane as a catalyst and treating the polymer with ethylene oxide to form both terminal hydroxyl groups.

The compounding ratio of the triol based on 10 moles of polydiene glycol is preferably 2.0–2.5 and the compounding ratio of aminoalcohol or triamine is preferably 1.0–3.0.

The mixture of these components is heated at a temperature of 60°–70° C. for 100 hours or more to effect the polymerization reaction.

In this reaction, if necessary, as a plasticizer use may be made of dioctyl adipate (abbreviated as DOA hereinafter), dioctyl sebacate (abbreviated as DOS), isodecylpelargonate and the like. As a diluent, use may be made of polybutene and diene polymers and as a catalyst, use may be made of dibutyltin dilaurate (abbreviated as DBTDL hereinafter), acetylacetone iron salt (abbreviated as FeAA hereinafter) and the like.

One embodiment of the structural formula of a binder according to the present invention obtained by reacting the above described HTPB with a triol as a trifunctional crosslinking agent, a diisocyanate as a curing agent and a diol as a bifunctional chain extender is shown as follows:

$$\text{O—PB—O—}\overset{\text{O}}{\overset{\|}{\text{C}}}\text{—}\overset{\text{H}}{\overset{|}{\text{N}}}\text{—R}_4\text{—}\overset{\text{H}}{\overset{|}{\text{N}}}\text{—}\overset{\text{O}}{\overset{\|}{\text{C}}}\text{—O—R}_3\text{—O—}\overset{\text{O}}{\overset{\|}{\text{C}}}\text{—}\overset{\text{H}}{\overset{|}{\text{N}}}\text{—R}_4\text{—}\overset{\text{H}}{\overset{|}{\text{N}}}\text{—}\overset{\text{O}}{\overset{\|}{\text{C}}}\text{—O—R}_1\text{—O}$$

with pendant group:
—O—C(=O)—N(H)—R₄—N(H)—C(=O)—O—R₁—O— connected to a second HTPB chain:

$$\text{O—PB—O—}\overset{\text{O}}{\overset{\|}{\text{C}}}\text{—}\overset{\text{H}}{\overset{|}{\text{N}}}\text{—R}_4\text{—}\overset{\text{H}}{\overset{|}{\text{N}}}\text{—}\overset{\text{O}}{\overset{\|}{\text{C}}}\text{—O—R}_1\text{—O}$$

In the above formula, HTPB is shown by HO—PB—OH, a triol is shown by $$\text{HO—R}_1\text{—OH},\quad \overset{\text{OH}}{\overset{|}{}}$$

a diol is shown by HO—R₃—OH, and a diisocyanate is shown by OCN—R₄—NCO.

When a diamine is used as a chain extender instead of a diol, the formula of —O—R₃—O— at the chain extending portion is only replaced with $$-\overset{\text{H}}{\overset{|}{\text{N}}}-\text{R}_2-\overset{\text{H}}{\overset{|}{\text{N}}}-.$$

The entire structural formula in this case is not shown for the diamine chain extender.

BRIEF EXPLANATION OF DRAWING

The FIGURE shows the relation of the molecular weight to the viscosity (at 60° C.) of HTPB used in the present invention and hydroxyl terminated polybutadiene polymer (R-45 polymer made by ARCO Chemical Co. Ltd. in U.S.A.) as a typical conventional embodiment.

BEST MODE OF CARRYING OUT THE INVENTION

Examples of the present invention will be explained with respect to the following Table 1.

TABLE 1

| | | | Example | | | | | | | | | |
|---|---|---|---|---|---|---|---|---|---|---|---|---|
| | | No. | 1 | 2 | 3 | 4 | 5 | 6 | 7 | 8 | 9 | 10 |
| Binder composition | HTPB | Hydroxyl group number (f) | 1.80 | 2.00 | 2.00 | 2.00 | 2.00 | 2.00 | 2.00 | 2.00 | 2.05 | 2.10 |
| | | Molecular weight | 1960 | 3160 | 3160 | 3160 | 3160 | 3160 | 3160 | 2750 | 3530 | 2350 |
| | | Mole | 10 | 10 | 10 | 10 | 10 | 10 2-ethyl- | 10 | 10 | 10 | 10 |

TABLE 1-continued

|  |  | Ex. | Ex. | Ex. | Ex. | Ex. | Ex. | Ex. | Ex. | Ex. | Ex. |
|---|---|---|---|---|---|---|---|---|---|---|---|
| Crosslinking agent | | Triol 1000 | Triol 250 | Triol 400 | Triol 1000 | Triol 3000 | 2-amino-propane diol | Triol 400 | Triol 250 | Triol 250 | Triol 1000 |
| Mole | | 2.00 | 2.75 | 3.00 | 3.00 | 4.00 | 2.75 | 3.00 | 2.42 | 3.05 | 2.00 |
| Chain extender | | MTDA | Diol 200 | Diol 200 | MTDA | Diol 2000 | Diol 200 | Diol 400 | MTDA | MTDA | MTDA |
| Mole | | 0.20 | 0.25 | 3.00 | 1.00 | 2.00 | 0.25 | 2.50 | 0.50 | 0.50 | 0.30 |
| Curing agent | | IPDI | IPDI | IPDI | IPDI | IPDI | IPDI | IPDI | IPDI | IPDI | IPDI |
| Mole | | 13,100 | 14,375 | 17,500 | 15,500 | 18,000 | 14,376 | 17,000 | 14,130 | 15,075 | 13,300 |
| Plasticizer | | DOA | DOA | DOA | DOA | DOA | DOA | DOA | DOA | DOA | DOA |
| % | | 10 | 20 | 15 | 15 | 10 | 20 | 15 | 20 | 20 | 15 |
| Molecular weight between crosslinks $\overline{M}c$ | | 8178 | 8613 | 8286 | 8481 | 8455 | 8526 | 8350 | 8630 | 8630 | 9494 |
| Mechanical properties of binder | $\sigma_{100}$ kg/cm$^2$ | 0.7 | 1.2 | 0.9 | 0.8 | 0.6 | 1.1 | 0.9 | 1.1 | 1.1 | 1.2 |
|  | $\sigma_b$ kg/cm$^2$ | 5.9 | 9.5 | 9.0 | 8.5 | 7.5 | 10.0 | 8.8 | 9.9 | 10.4 | 11.5 |
|  | $\epsilon_b$ % | 1600 | 2000 | 2100 | 2200 | 2350 | 2000 | 2150 | 2050 | 1950 | 1400 |
| Mechanical properties of propellant | $\sigma_m$ kg/cm$^2$ | 6.2 | 9.3 | 8.9 | 8.5 | 7.5 | 9.2 | 8.8 | 9.3 | 9.3 | 11.4 |
|  | $\epsilon_m$ % | 22 | 25 | 26 | 29 | 25 | 24 | 28 | 26 | 25 | 21 |
|  | E kg/cm$^2$ | 34 | 90 | 85 | 75 | 63 | 92 | 80 | 88 | 90 | 93 |

|  |  |  | Comparative Example | | |
|---|---|---|---|---|---|
|  |  | No. | 1 | 2 | 3 |
| Binder composition | HTPB | Hydroxyl group number (f) | 1.70 | 2.20 | 2.20 |
|  |  | Molecular weight | 1820 | 2200 | 2200 |
|  |  | Mole | 10 | 10 | 10 |
|  | Crosslinking agent | | Triol 1000 | Triol 1000 | 0 |
|  | Mole | | 2.00 | 2.00 | 0 |
|  | Chain extender | | MTDA | MTDA | 0 |
|  | Mole | | 0.20 | 0.30 | 0 |
|  | Curing agent | | IPDI | IPDI | IPDI |
|  | Mole | | 13,100 | 13,300 | 10,000 |
|  | Plasticizer | | DOA | DOA | DOA |
|  | % | | 10 | 15 | 10 |
| Molecular weight between crosslinks $\overline{M}c$ | | | — | — | — |
| Mechanical properties of binder | $\sigma_{100}$ kg/cm$^2$ | | 0.4 | 1.4 | 0.6 |
|  | $\sigma_b$ kg/cm$^2$ | | 4.7 | 13.3 | 5.6 |
|  | $\epsilon_b$ % | | 1800 | 980 | 1300 |
| Mechanical properties of propellant | $\sigma_m$ kg/cm$^2$ | | 5.2 | 12.5 | 5.3 |
|  | $\epsilon_m$ % | | 26 | 15 | 18 |
|  | E kg/cm$^2$ | | 25 | 120 | 31 |

Remarks

1. HTPBs in Examples 1–10 and Comparative Example 1 were produced by polymerizing butadiene by using dilithiobutane as a catalyst and treating the polymer with ethylene oxide to hydroxylate both terminal groups. HTPB in Comparative Examples 2 and 3 was R-45 polymer (Trade Mark, made by ARCO Chemical Co. Ltd. U.S.A.)

2. The test process of the mechanical properties of the binder was according to JIS K6301 (physical test process of vulcanized rubber).

(2-1) Tensile test condition
   Specimen: No. 3 dumbbell
   Tensile rate: 1,000 mm/min.
   Temperature: Room temperature (2-2) Measured item
   $\sigma_{100}$(kg/cm$^2$) = stress at 100% elongation
   $\sigma_b$(kg/cm$^2$) = tensile strength
   $\epsilon_b$(%) = elongation 3. The mechanical properties of the propellant were determined following to the tensile test manner under the following conditions.

(3-1) The shape of the specimen conformed to JAN-NAF type of the following dimensions.
   Total length: 12.7 cm (5"),
   Total width: 2.54 cm (1"),
   Thickness: 1.27 cm (0.50")
   Span between marked points: 5.08 cm (2.0")
   Width of the portion to be measured: 0.95 cm (0.375")
   Shoulder portion R: 0.762 cm (0.3000").

(3-2) Tensile rate = 50 mm/min.
   Temperature = Room temperature (3-3) Measured item
   $\sigma_m$ (kg/cm$^2$) = Maximum tensile strength
   $\epsilon_m$(%) = Elongation at maximum stress
   E (kg/cm$^2$) = Initial Young's modulus $$E = (\tfrac{1}{2}\sigma_m / \epsilon_{\tfrac{1}{2}\sigma_m}) \times 100$$

4. Molecular weight $\overline{M}c$ between crosslinks was calculated from the following equation.
   $M_a$ = Molecular weight of HTPB polymer
   a = Compounded mole of HTPB polymer
   $M_b$ = Molecular weight of crosslinking agent
   b = Compounded mole of crosslinking agent
   $\overline{M}_c$ = Molecular weight of chain extender
   c = Compounded mole of chain extender
   $M_e$ = Molecular weight of diisocyanate
   e = Compounded mole of diisocyanate $$Mc = (2/3b)(aM_a + bM_b + cM_c + eM_e),$$
$$e = \tfrac{1}{3}(2a + 2b + 2c).$$

Examples 1-10 show the composition, molecular weight between the crosslinks and mechanical properties of the binders obtained by using HTPB having a hydroxyl group numbers of 1.80, 2.00 and 2.10 and varying the kind and added mole number of the above described crosslinking agent, chain extender and curing agent, and the mechanical properties of propellants obtained by compounding 11% of said binders, 73% of an oxidizer (ammonium perchlorate) and 16% of a burning assistant (powdery aluminum). Comparative Examples 1 and 2 show the case where the hydroxyl group number in HTPB is not within the limited range and Comparative Example 3 shows one embodiment concerning a conventional binder for propellant using a small amount of binder, in which the crosslinks are formed through urethane reaction of HTPB with a diisocyanate.

The reason why the hydroxyl group number (f) is limited to not less than 1.8 in the present invention is that a hydroxyl group number of less than 1.8 means that the proportion of polymer wherein the hydroxyl group number is 1, present in the polymer wherein the hydroxyl group number is nominally 2, is larger than in the case where the hydroxyl group number (f) is not less than 1.8 and particularly as the hydroxyl group number decreases, the crosslinkage and the chain extension produced with the crosslinking agent and the chain extender are smaller and the required physical properties of the binder and the physical properties of the propellant wherein the binder is used in the above described ratio can not be obtained. This is shown by the fact that the stress ($\sigma_{100}$) at 100% elongation and the tensile strength ($\sigma_b$) of the binder in Comparative Example 1 (f=1.70) in Table 1 are 0.4 kg/cm$^2$ and 4.7 kg/cm$^2$ respectively, which are greatly inferior to the stress and the tensile strength of every Example according to the invention (f=1.80, 2.0, 2.10). Furthermore, the initial Young's modulus (E) of the propellant using the binder in Comparative Example 1 is 25 kg/cm$^2$ and can not be practically used, because the propellant requires an initial Young's modulus of at least 30 kg/cm$^2$. When the hydroxyl group number exceeds 2.1, the crosslinkage density of the binder becomes too high, and the propellant using this binder is hard and the elongation is low and the required properties can not be obtained. This is apparent from the fact that the elongations $\epsilon_b$ of the binders in Comparative Examples 2 and 3 (f=2.20) in Table 1 are 980 and 1,300% respectively and the elongations at the maximum stress of the propellants using said binders are 15% and 18% respectively, which are lower than those in Examples 1-10.

When the number average molecular weight of the polydiene glycol is less than 1,000, the performance of said polydiene glycol as the binder deteriorates. Even if the compounding ratio of the binder based on the total amount of the propellant is increased for solving this problem, the binding function to the oxidizer grains is not attained and the specific impulse of the propellant lowers. When the number average molecular weight exceeds 5,000, the viscosity of the polydiene glycol is too high and the moldability of the propellant slurry lowers, so that such a polydiene glycol is not preferable from a production standpoint as the polymer for a solid propellant.

On the other hand, the binder obtained by the combination of a polydiene glycol having a hydroxyl group number of 1.8-2.1 and a number average molecular weight of 1,000-5,000, a trifunctional crosslinking agent, a diisocyanate and a bifunctional chain extender, even if the hydroxyl group number and molecular weight of the polydiene glycol vary in every production lot, can provide, as shown in Examples in Table 1, the mechanical properties and other physical properties having the desired reproducibility. This is achieved by regulating the molecular weight between the crosslinks in the binder to be at the given value by adjusting the molecular weight and compounded mole number of the crosslinking agent, diisocyanate and chain extender. For example, referring to Examples 8 and 9, even if the hydroxyl group number and molecular weight of each HTPB are 2.00 and 2.05, and 2,750 and 3,530 respectively and are uneven, since the molecular weight between the crosslinks is set to be commonly 8,630 in both the Examples, the mechanical properties of the binders and the mechanical properties of the propellants produced in these Examples are substantially equal respectively and are superior to those of Comparative Example 3.

In other Examples, the above described mechanical properties are excellent as shown in Table 1. In each of the above described Examples, the hydroxyl group in the polydiene glycols is primary. However, in the polydiene glycols having secondary or tertiary hydroxyl groups, the reaction itself of the binder is not different from the reaction shown in the above described structural formula with primary hydroxyl groups but the reactivity of the hydroxyl groups with the diisocyanate lowers. Table 2 shows this decreased reactivity by reference to the unreacted fraction of the diisocyanate.

Unreacted fraction =

$$\frac{\text{Mole of unreacted diisocyanate in binder}}{\text{mole of total isocyanate in binder}} \times 100\%.$$

As seen from Test Nos. III and IV in Table 2, the unreacted fraction of IPDI (heating condition: 60° C.×5 hr.) is 39% (in HTPB in Example 4 in Table 1, hydroxyl group: primary) and 30% (in HTPB in Comparative Example 3) respectively but the unreacted fraction of IPDI in HTPB having secondary hydroxyl group in Test No. I (hydroxyl group in HTPB in Example 4 in Table 1: secondary hydroxyl group) greatly increases to 95%. The unreacted fraction in the case of the tertiary hydroxyl group of polydiene glycol, when the diisocyanate is TDI, is shown in Test No. II.

TABLE 2

| | | Test No. | | | |
|---|---|---|---|---|---|
| | | I<br>HTPB<br>(Hydroxyl<br>group:<br>secondary) | II<br>HTPB<br>(Hydroxyl<br>group:<br>tertiary) | III<br>HTPB in<br>Example 4<br>(Table 1) | IV<br>HTPB in<br>Comparative<br>Example 3<br>(Table 1) |
| Isocyanate | Heating condition | | | | |
| IPDI | 60° C. × 0.5 hr. | 99% | 99% | 85% | 82% |

TABLE 2-continued

| | | Test No. | | | |
|---|---|---|---|---|---|
| | | I | II | III | IV |
| | | HTPB | HTPB | | HTPB in |
| | | (Hydroxyl | (Hydroxyl | HTPB in | Comparative |
| | Heating | group: | group: | Example 4 | Example 3 |
| Isocyanate | condition | secondary) | tertiary) | (Table 1) | (Table 1) |
| | 60° C. × 2 hr. | 97 | 99 | 57 | 53 |
| | 60° C. × 5 hr. | 95 | 98 | 39 | 30 |
| | 60° C. × 8 hr. | 92 | 98 | 33 | 25 |
| TDI | 60° C. × 0.5 hr. | 76% | 95% | 68% | 63% |
| | 60° C. × 2 hr. | 50 | 90 | 42 | 32 |
| | 60° C. × 5 hr. | 30 | 87 | 26 | 13 |
| | 60° C. × 8 hr. | 25 | 82 | 23 | 10 |

Remarks:
Samples I and II in Test No. I and II were produced by the treatment with benzaldehyde and benzophenone respectively instead of ethylene oxide in Remarks 1 in Table 1.

TABLE 3

| HTPB | Triol | MTDA mol | TDI mol | DOA % | Mechanical properties of binder | | | Mechanical properties of propellant | | |
|---|---|---|---|---|---|---|---|---|---|---|
| | | | | | $\sigma_{100}$ kg/cm$^2$ | $\sigma_b$ kg/cm$^2$ | $\epsilon_b$ % | $\sigma_m$ kg/cm$^2$ | $\epsilon_m$ % | E kg/cm$^2$ |
| Secondary 10 mole Test No. 1 in Table 2 | Molecular weight 1000, 3 mole | 1 | 15.5 | 15 | 0.7 | 8.1 | more than 2350 | 7.6 | 26 | 61 |
| Tertiary 10 mole Test No. 2 in Table 2 | Molecular weight 3000, 3 mole | 1 | 15.5 | 15 | 0.7 | 7.6 | more than 2350 | 7.4 | 25 | 57 |

Table 3 shows the composition and the mechanical properties of the binders obtained by using HTPB in Test Nos. I and II in Table 2 and the mechanical properties of the propellants obtained by using such binders. The mechanical properties in any case show an improvement as compared with those of Comparative Example 3 in Table 1 and particularly the improvement of the elongation $\epsilon_b$ (more than 2,350%) of the binder is noticeable. From the explanation concerning Table 2 it has been confirmed that the reactivity of the polydiene glycol with the diisocyanate is reduced by making the hydroxyl group of the polydiene glycol secondary or tertiary and therefore, it is apparent that the pot life of the binder obtained by using said polydiene glycol and the propellant obtained by using said binder is prolonged. The data in Table 3 confirms that the mechanical properties of the binder and the propellant are higher than those of the prior embodiment and that even TDI, the use of which has been considered to be difficult because of the high reactivity, can be used.

The following explanation relates to the second aspect of the present invention, which consists in the binder for a polybutadiene composite propellant obtained by the combination of a polydiene glycol having a hydroxyl group number of 1.8–2.1 and a number average molecular weight of 1,000–3,500, a diene polymer having no functional group or not more than 1 functional group, a trifunctional crosslinking agent, a diisocyanate and a bifunctional chain extender. The term "diene polymer" used herein means the product obtained by omitting the treatment for formation of the hydroxyl group of the above described polydiene glycol, i.e. it is produced by polymerizing butadiene in an organic solvent by using dilithium compound and then treating the resulting polymer with an acid.

This aspect of the present invention will be explained with reference to Table 4 and the accompanying FIGURE hereinafter.

TABLE 4

| | | Example | | Comparative Example | |
|---|---|---|---|---|---|
| No. | | 11 | 12 | 4 | 5 |
| Molecular weight of HTPB | | 1900 | 3160 | 4700 | 2750 |
| Viscosity of HTPB (ps) | | 17.5 | 45.0 | 85.0 | 60.0 |
| Binder composition | HTPB (mol) | 10 | 10 | 10 | 10 |
| | Triol 1000 (mol) | 1.8 | 3.0 | 4.5 | 0 |
| | MTDA, (mol) | 0.15 | 1.00 | 2.00 | 0 |
| | IPDI, (mol) | 12.85 | 15.5 | 18.75 | 9 |
| | DOA, (%) | 0 | 6 | 15 | 10 |
| | Diene polymer, (%) | 15 | 5 | 0 | 0 |
| Molecular weight between crosslinks of binder | | 8767 | 8481 | 8282 | — |
| Slurry viscosity of propellant (KPS) | | 3.6 | 3.4 | 5.3 | 4.0 |
| Mechanical properties of binder | $\sigma_{100}$ (kg/cm$^2$) | 0.8 | 0.8 | 0.9 | 0.7 |
| | $\sigma_b$ (kg/cm$^2$) | 8.6 | 8.9 | 9.0 | 5.8 |
| | $\epsilon_b$ (%) | 2200 | 2200 | 2200 | 1050 |
| Mechanical properties of propellant | $\sigma_m$ (kg/cm$^2$) | 10.3 | 8.8 | 9.5 | 6.7 |
| | $\epsilon_m$ (%) | 28 | 32 | 27 | 21 |
| | E (kg/cm$^2$) | 94 | 69 | 87 | 55 |

Remarks (1) Polymer viscosity: measured by BM type viscometer (polymer temperature 60°)

(2) Slurry viscosity: measured by BH type viscometer (slurry temperature 60°)

(3) HTPBs in Examples 11–12 and Comparative Example 4 were produced in the same manner as described in Remarks 1 in Table 1. HTPB following Comparative Example 5 is R-45 polymer (Trade mark) made by ARCO Chemical Co. Ltd. in U.S.A.

HTPBs in Examples 11 and 12 have a hydroxyl group number of 2.0 and number average molecular weights of 1,900 and 3,160 respectively. These polydiene glycols are synthesized through living polymerization process and the polymer viscosities are 17.5 ps (60° C.) and 45.0 ps (60° C.) respectively and are lower than that of the embodiment of Comparative Example 5 mentioned hereinafter. HTPB in Comparative Example 4 has a molecular weight of 4,700 exceeding the above described limited range, so that the viscosity is 85.0 ps (60° C.).

HTPB in Comparative Example 5, representing a typical prior embodiment, is R-45 polymer developed by ARCO Chemical Co. Ltd. in U.S.A. and is a HTPB produced by a radical polymerization process, which has a number average molecular weight of 2,750, a functional group number of 2.2–2.5 and a viscosity of 60.0 ps (60° C.)

The relation of the viscosity to the molecular weight in the above described Examples and Comparative Example is shown in the FIGURE by a graph. The reason for setting the upper limit of the molecular weight of the polydiene glycol at 3,500 is based on the fact that the viscosity (60° C.) of the polydiene glycol is maintained less than 55 ps and this is shown in the FIGURE. The reasons for defining the lower limit of the hydroxyl group number and the number average molecular weight of the polydiene glycol are mentioned in the explanation of the first aspect of the present invention. Thus, the present invention is characterized in that HTPB is limited to a low viscosity and a diene polymer having no functional group or not more than 1 of functional group is compounded, whereby no plasticizer is used or the amount of a plasticizer used is reduced without deteriorating the physical properties of a propellant comprising a small amount of a binder. Thus, as shown in Table 4, the content of DOA as the plasticizer in the binder composition can be reduced from 15% (Comparative Example 4) and 10% (Comparative Example 5) to 0% (Example 11) and 6% (Example 12). The slurry viscosity of the propellants obtained by compounding 11% of each of these binders, 73% of an oxidizer (ammonium percolate) and 16% of a burning assistant (powdery aluminum) is 5.3 in Comparative Example 4 and 4.0 in comparative Example 5 but is 3.6 (in Example 11) and 3.4 (in Example 12). This shows the improvement of the moldability of propellant. Furthermore, it can be expected that the specific impulse of the propellants according to the present invention is improved in proportion to the decrease of the amount of the plasticizer added and the mechanical properties of the binder and the propellant are better than those of Comparative Example 5 as shown in Table 4.

As mentioned above, according to the second aspect of the present invention, the addition of the above described diene polymer can improve the elongation of the binder without adversely affecting the tensile strength. Furthermore, the unevenness of the physical properties of the binders due to the difference of the properties between production lots of the polydiene glycol and of the propellants obtained by using the binders can be easily controlled by adjusting the amount of the diene polymer added.

An amount of the diene polymer added is preferred to be 5–30% by weight based on the total amount of the binder.

As mentioned above in detail, in the first aspect of the present invention, the molecular weight between the crosslinks is determined by combining the polydiene glycol having the limited hydroxyl group number and number average molecular weight with the crosslinking agent, the diisocyanate and the chain extender. The binder in each lot is compounded so as to obtain the predetermined value, so that the unevenness of the physical properties of each lot of the binder can be made uniform and reliably good physical properties can be obtained. In addition, by using a polydiene glycol having secondary or tertiary hydroxyl groups, the reactivity of the polydiene glycol with the diisocyanate is lowered, whereby the pot life when forming the propellant can be prolonged while keeping the above described physical properties and it is possible to use a diisocyanate having a relatively high reactivity which has been heretofore been difficult to use. In the second aspect of the present invention, the amount of the plasticizer used can be reduced or the addition of the plasticizer becomes unnecessary by lowering the upper limit of the number average molecular weight of the above described polydiene glycol to 3,500 and adding the diene polymer having a functional group number of not greater than 1 to a composition which is otherwise completely the same as in the first aspect of the present invention. Accordingly, it is possible to prevent the decrease of the specific impulse of the propellant due to the addition of the plasticizer while maintaining the above described physical properties and the moldability. Thus, the first and second aspects of the present invention can provide an advantageous binder for producing a polybutadiene propellant using a small amount of binder.

We claim:

1. A binder for a polydiene composite propellant obtained by reacting a polydiene glycol having a hydroxyl group number of 1.8–2.1 and a number average molecular weight of 1,000–5,000 with a trifunctional crosslinking agent, a diisocyanate and a bifunctional chain extender; said polydiene glycol being obtained by polymerizing butadiene in an organic solvent by using a dilithium compound as a catalyst and treating the resulting polymer with a substance selected from the group consisting of ethylene oxide, propylene oxide, aldehydes and ketones to hydroxylate both terminal groups, and wherein the binder has an average molecular weight between crosslinks from about 7,000 to 15,000.

2. A binder as claimed in claim 1, wherein the polydiene glycol is polydiene glycol having secondary or tertiary terminal hydroxyl groups.

3. A binder as claimed in claim 1 or 2, wherein the polydiene glycol is polybutadiene glycol.

4. A binder for polydiene composite propellant obtained by reacting a polydiene glycol having a hydroxyl group number of 1.8–2.1 and a number average molecular weight of 1,000–3,500 with a polydiene polymer having a functional group number of not more than 1, a trifunctional crosslinking agent, a diisocyanate and a bifunctional chain extender; said polydiene glycol being produced by polymerizing butadiene in an organic solvent by using a dilithium compound as a catalyst and treating the resulting polymer with a substance selected from the group consisting of ethylene oxide, propylene oxide, aldehydes and ketones to hydroxylate both terminal groups, and wherein the binder has an average molecular weight between crosslinks from about 7,000 to 15,000.

5. A binder as claimed in claim 4, wherein the polydiene glycol is polybutadiene glycol.

* * * * *